United States Patent
Sonti et al.

(10) Patent No.: US 10,915,704 B2
(45) Date of Patent: Feb. 9, 2021

(54) INTELLIGENT REPORTING PLATFORM

(71) Applicant: Dell Products L.P., Round Rock, TX (US)

(72) Inventors: Giridhar Rao Sonti, Bangalore (IN); Timothy Ramamurthy, Bangalore (IN); Praveen Kumar Belkar, Bangalore (IN); Ranjan S. Purushothama, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 16/178,832

(22) Filed: Nov. 2, 2018

(65) Prior Publication Data
US 2020/0142955 A1    May 7, 2020

(51) Int. Cl.
   *G06F 40/186*  (2020.01)
   *H04L 29/08*   (2006.01)
   *G06F 40/174*  (2020.01)

(52) U.S. Cl.
   CPC ......... *G06F 40/186* (2020.01); *G06F 40/174* (2020.01); *H04L 67/06* (2013.01)

(58) Field of Classification Search
   CPC ....... G06F 40/186; G06F 40/174; H04L 67/06
   See application file for complete search history.

(56) References Cited

U.S. PATENT DOCUMENTS

| | | | |
|---|---|---|---|
| 8,412,749 B2* | 4/2013 | Fortuna | G06F 16/951 707/804 |
| 9,424,333 B1* | 8/2016 | Bisignani | H04L 63/08 |
| 9,886,497 B2* | 2/2018 | Arnaud | G06F 16/22 |
| 10,061,763 B2* | 8/2018 | Tamilarasan | G06F 3/0482 |
| 2010/0185653 A1* | 7/2010 | Fortuna | G06F 16/951 707/769 |
| 2015/0161183 A1* | 6/2015 | Arnaud | G06F 16/313 707/741 |
| 2017/0286388 A1* | 10/2017 | Tamilarasan | G06F 16/248 |

* cited by examiner

Primary Examiner — Maikhanh Nguyen
(74) Attorney, Agent, or Firm — Ryan, Mason & Lewis, LLP

(57) ABSTRACT

A processing platform is configured to maintain a plurality of reporting templates in the form of respective data structures, each of the data structures comprising a first field indicative of whether or not the corresponding template is a dynamic template and a plurality of additional fields comprising respective presentation unit identifiers having respective assigned values. The processing platform receives input data, and identifies at least one of the reporting templates that is relevant to the input data. For an identified reporting templates that is a dynamic template, the processing platform generates report presentation output in which presentation units corresponding to respective ones of the presentation unit identifiers are generated based at least in part on respective portions of the input data. The processing platform delivers the report presentation output to at least one of client device over a network.

20 Claims, 17 Drawing Sheets

```
LOAD        WordClient wordClient = WordFactoryClient.loadTemplate(URL);
TEMPLATE REPLACE     wordClient.replaceHeader(replacementMarker "REPORT_TITLE_MARKER", reportName "new value");
HEADER REPLACE     wordClient.replaceText(replacementMarker "APP_NAME", text "new value");
TEXT WordTable wordTable = new WordTable();
            wordTable.setTableReplacementMarker("TABLE_MARKER");
            wordClient.replaceTable(wordTable);

wordTable.getHeaders().add(new WordTableHeader("Rule Name", 500));
            wordTable.getHeaders().add(new WordTableHeader("Category", 600));

REPLACE     WordTableRow row = new WordTableRow();
TABLE       row.setRowColor(RowColor.WARNING);
            row.setSingleCell("Rule Name", ruleName);
            row.setSplitCell("Category", Arrays.asList("testing", "business"));
            row.setSplitCell("Criteria", Arrays.asList("test == true", "test == false"));
            row.setSingleCell("Passing", "");
```

FIG. 6

REPLACE TEXT

```
public void replaceText(String replacementMarker, String text) {
    List<Object> texts = SearchUtils.getAllElementFromObject(template.getMainDocumentPart(), Text.class);

for (Object textObjects : texts) {
        Text textElement = (Text) textObjects;
        if (replacementMarker.equals(textElement.getValue())) {
            textElement.setValue(text);
        }
    }
}
```

FIG. 7A

REMOVE SECTION

```java
public void removeSection(String startMarker, String endMarker, int removeWhiteSpaceSections) {
    List<Object> content = template.getMainDocumentPart().getContent();
    List<Object> toRemove = new ArrayList<>();
    boolean startFound = false;
    boolean endFound = false;
    int whiteSpaceTrim = 0;
    for (Object section : content) {
        if (checkSectionContainsMarker(startMarker, section)) {
            startFound = true;
            toRemove.add(section);
        } else if (checkSectionContainsMarker(endMarker, section)) {
            endFound = true;
            toRemove.add(section);
        } else if (endFound && whiteSpaceTrim < removeWhiteSpaceSections) {
            toRemove.add(section);
            whiteSpaceTrim++;
        } else if (endFound && whiteSpaceTrim <= removeWhiteSpaceSections) {
            toRemove.add(section);
            break;
        } else if (startFound) {
            toRemove.add(section);
        }
    }
    content.removeAll(toRemove);
}
```

FIG. 7B

REPLACE HEADER

```
public void replaceHeader(String replacementMarker, String reportName) {
    for (Part part : template.getParts().getParts().values()) {
        for (Object text : SearchUtils.getAllElementFromObject(part, Text.class)) {
            Text textElement = (Text) text;
            if (textElement.getValue().equals(replacementMarker)) {
                textElement.setValue(reportName);
            }
        }
    }
}
```

FIG. 7C

REPLACE TABLE

```
public static void replaceTable(WordprocessingMLPackage template, WordTable wordTable) {
    List<Object> tables = SearchUtils.getAllElementFromObject(template.getMainDocumentPart(), Tbl.class);

Tbl tempTable = getTemplateTable(tables, wordTable.getTableReplacementMarker());
    List<Object> rows = SearchUtils.getAllElementFromObject(tempTable, Tr.class);

Tr headerRow = (Tr) rows.get(0);
    Tr dataRowTemplate = (Tr) rows.get(1);
    headerRow.getContent().clear();
    for (WordTableHeader header : wordTable.getHeaders()) {
        addHeaderTc(headerRow, header);
    }
    for (WordTableRow dataRow : wordTable.getRows()) {
        addRowToTable(tempTable, dataRowTemplate, wordTable.getHeaders(), dataRow);
    }
    tempTable.getContent().remove(rows.get(1));
}
```

FIG. 7D

DELETE SLIDE

```
//Add all dto table names into this list
List<string> dtoTableNames = new List<string>();
dtoTableNames = getDTOTableNames(reportDataSetMap);

bool result = false;
int currentSlideNumber = 0;
int templateSlidesCount = templatePres.Slides.Count;
try
{
    for (int count = 0; count < templateSlidesCount; count++)
    {
        propertyToSearch = "Slide_" + count + "_DataBinding";
        SearchRes = (string)templatePres.DocumentProperties.GetCustomProperty(propertyToSearch);
        bool delSlide = true;
        foreach (var item in SearchRes.Split(','))
        {
            result = dtoTableNames.Contains(item.ToString());
            if ((result == true) || (item.ToString().ToLower() == "fixed"))
            {
                delSlide = false;
                break;
            }
        }
        if (delSlide == true)
        {
            logger.Info("deleting slide number " + currentSlideNumber);
            templatePres.Slides.Delete(currentSlideNumber);
            currentSlideNumber--;
        }
        currentSlideNumber++;
    }
}
catch (Exception e)
{
    logger.Error("Error while populating the template custom properties: " + e.Message);
    throw;
}
```

FIG. 7E

SAMPLE REPORT INPUT DATA

```
{
    "userInfo": [{
        "userName":"John",
        "currentDate":"June 29, 2018",
        "currentYear" "2018"
    }]
}
```

FIG. 8

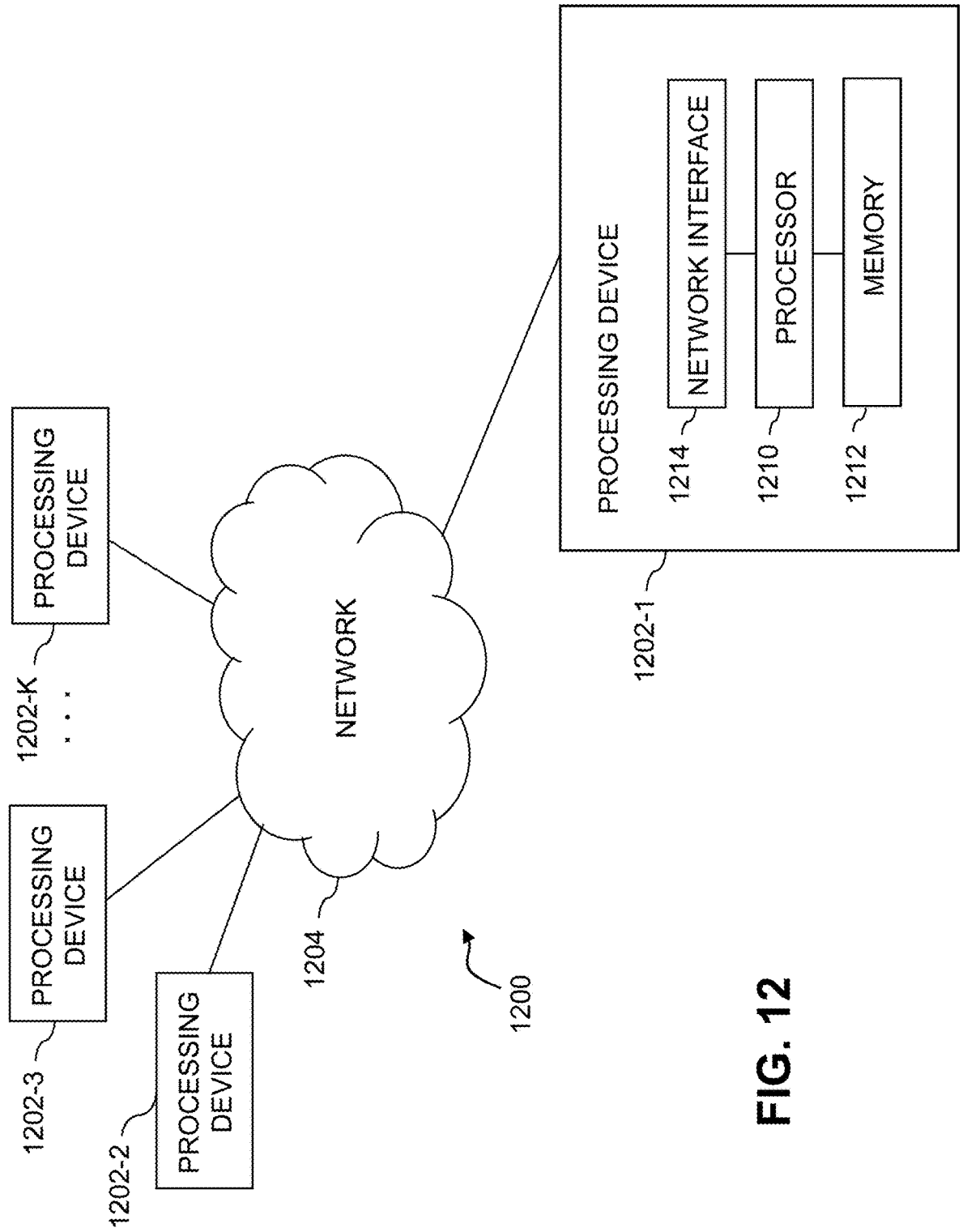

INTELLIGENT REPORTING PLATFORM

FIELD

The field relates generally to information processing systems, and more particularly to template-based data presentation in such systems.

BACKGROUND

In many information processing systems, there is a need to present data in the form of slides or other types of report presentation output. For example, reporting functionality is an important deliverable in many different types of software application contexts. However, conventional implementations of such reporting functionality fail to provide adequate levels of efficiency and flexibility in adapting to the dynamic nature of business workflows and other related conditions. As a result, excessive amounts of time and money are often spent in developing and configuring multiple distinct reporting functionalities to provide different report presentation outputs for different reporting contexts, as well as supporting different revisions within a given reporting context.

SUMMARY

Illustrative embodiments provide techniques for implementing intelligent reporting services utilizing dynamic templates. For example, some embodiments are in the form of an intelligent reporting platform that provides intelligent reporting services such as automated report generation to clients over a network, based at least in part on dynamic templates that illustratively incorporate user-configurable fields for characterizing dynamic input for respective slides or other types of report presentation output.

These and other embodiments implement reporting functionality that readily scales to accommodate a wide variety of different business needs while also decreasing the time and cost involved. For example, some embodiments are configured to provide a decoupling of report layout and rendering, intelligent template reporting adaptable to changing requirements, and reusable template definitions.

In one embodiment, an apparatus comprises a processing platform, with the processing platform including a plurality of processing devices each comprising a processor coupled to a memory. The processing platform is configured to communicate over at least one network with one or more client devices. The processing platform is further configured to maintain a plurality of reporting templates in the form of respective data structures, each of the data structures comprising a first field indicative of whether or not the corresponding template is a dynamic template and a plurality of additional fields comprising respective presentation unit identifiers having respective assigned values.

The processing platform illustratively receives input data, and identifies at least one of the reporting templates that is relevant to the input data. For an identified reporting template that is a dynamic template, the processing platform generates report presentation output in which presentation units corresponding to respective ones of the presentation unit identifiers are generated based at least in part on respective portions of the input data.

The processing platform illustratively delivers the report presentation output to at least one of the client devices over the network.

In some embodiments, a given one of the dynamic templates comprises in the plurality of additional fields of its data structure at least a first additional field comprising a first presentation unit identifier having a first assigned value indicating that the corresponding presentation unit is fixed and a second additional field comprising a second presentation unit identifier having a second assigned value different than the first assigned value and indicating that the corresponding presentation unit is not fixed but is instead variable and subject to modification based at least in part on a corresponding portion of the input data.

The presentation units may comprise respective slides of a slide-based report. In such an arrangement, the plurality of additional fields of the data structure of a given one of the dynamic templates illustratively comprise respective presentation unit identifiers each identifying a different one of the slides of the slide-based report. Numerous other types of presentation units can be used.

These and other illustrative embodiments include, without limitation, methods, apparatus, information processing systems, and computer program products comprising processor-readable storage media.

BRIEF DESCRIPTION OF THE DRAWINGS

FIG. 6 shows example library components for implementing intelligent reporting services utilizing dynamic templates in an illustrative embodiment.

FIGS. 7A through 7E show respective portions of software program code for performing respective replace text, remove section, replace header, replace table and delete slide functionality in implementing intelligent reporting services utilizing dynamic templates in an illustrative embodiment.

FIG. 8 shows sample report input data in an illustrative embodiment.

FIGS. 11 and 12 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
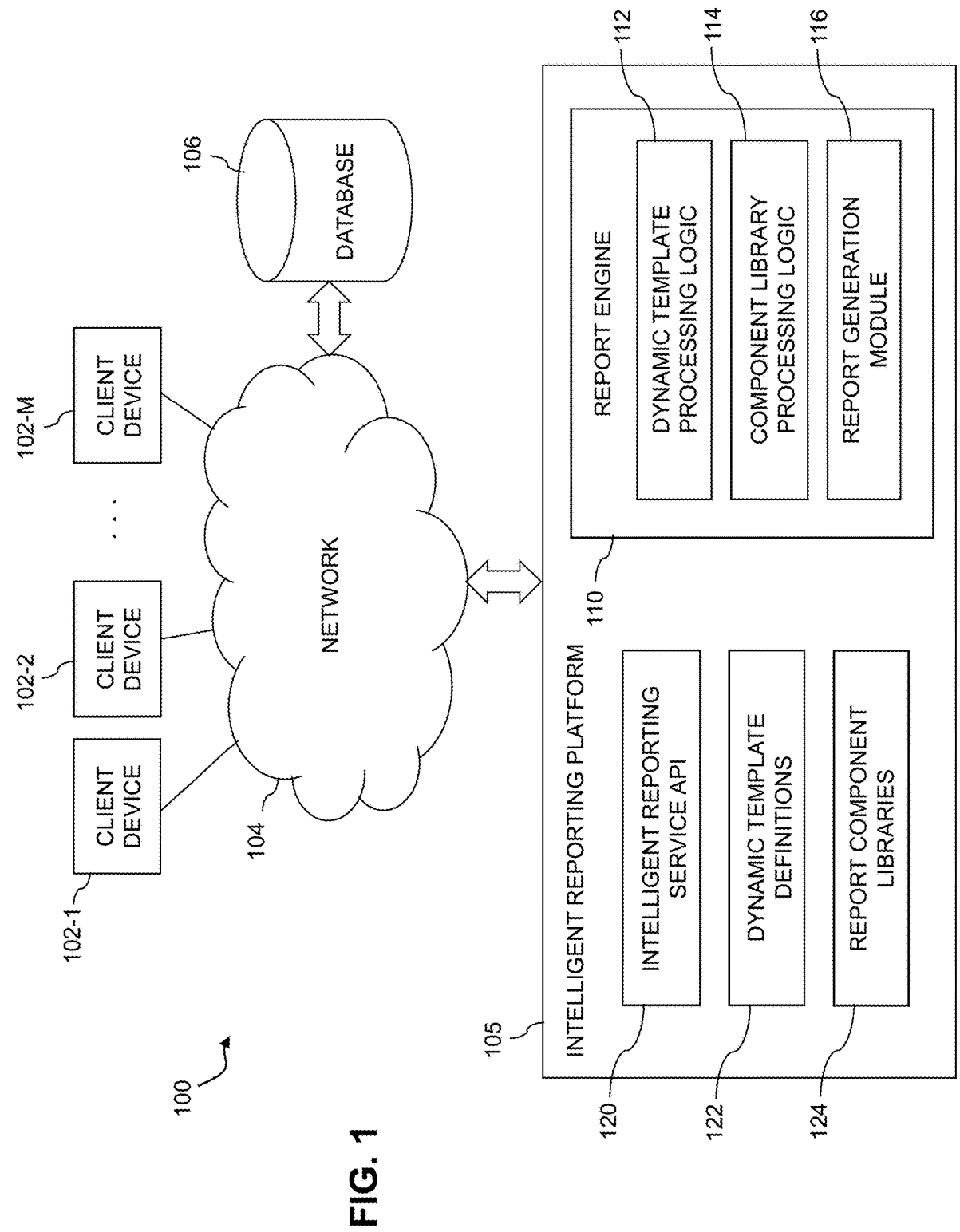
FIG. 1 is a block diagram of an information processing system including a processing platform implementing intelligent reporting services utilizing dynamic templates in an illustrative embodiment.

FIG. 1 shows an information processing system 100 configured in accordance with an illustrative embodiment. The information processing system 100 comprises a plurality of client devices 102-1, 102-2, . . . 102-M configured to communicate over a network 104 with an intelligent reporting platform 105. The intelligent reporting platform 105 is an example of what is more generally referred to herein as a "processing platform," and it is to be appreciated that a wide variety of other types of processing platforms can be used in other embodiments. Also coupled to the network 104 is a database 106.

The intelligent reporting platform 105 comprises a report engine 110 that includes dynamic template processing logic 112, component library processing logic 114 and a report generation module 116.

Also included in the intelligent reporting platform 105 are additional components comprising an intelligent reporting service application programming interface (API) 120, dynamic template definitions 122 and report component libraries 124.

The intelligent reporting platform 105 is assumed to comprise a plurality of processing devices each having a processor coupled to a memory. One or more such processing devices may be implemented at least in part utilizing one or more virtual machines, containers or other types of virtualization infrastructure. Examples of processing platform implementations will be described below in conjunction with FIGS. 11 and 12.

The intelligent reporting platform 105 in some embodiments more particularly comprises at least a portion of a cloud-based data center or other cloud-based computer system, although other types of processing platforms may be used in other embodiments. For example, in some embodiments, the intelligent reporting platform 105 can part of an enterprise-based computer system rather than a cloud-based computer system.

A given cloud-based implementation of intelligent reporting platform 105 illustratively includes commercially-available cloud infrastructure, such as an allocated portion of an Amazon Web Services (AWS) system. Other examples of cloud-based systems that can be used to implement one or more processing platforms of system 100 include Google Cloud Platform (GCP) and Microsoft Azure.

A cloud-based system of this type illustratively comprises a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer. Additional or alternative layers may be used in implementing the intelligent reporting platform 105, including by way of example a Function-as-a-Service (FaaS) layer.

The intelligent reporting platform 105 is assumed to be accessible to a plurality of system users. The term "user" in this context and elsewhere herein is intended to be broadly construed so as to encompass, for example, human, hardware, software or firmware entities, as well as various combinations of such entities. At least some of the system users can be associated with respective ones of the client devices 102.

The client devices 102 associated with system users can include, for example, desktop, laptop or tablet computers, mobile telephones, or other types and arrangements of devices that support user interfaces to functionality of system 100.

The network 104 may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art. The term "network" as used herein is intended to be broadly construed, and may encompass, for example, an internal network of a given system over which client devices 102 access intelligent reporting platform 105.

Although only a single intelligent reporting platform 105 is shown in this embodiment, the system 100 can comprise one or more additional intelligent reporting platforms, each possibly associated with a different set of client devices 102.

Other examples of client devices 102 include network, storage and compute resources of IT infrastructure of the system 100.

In some embodiments, the client devices 102 provide real-time streaming and/or batch input data to the intelligent reporting platform 105. For example, input data provided to the intelligent reporting platform 105 by one or more of the client devices 102 illustratively comprises at least one of real-time streaming data received from one or more real-time data sources and batch data retrieved from one or more databases or data lakes.

At least a subset of the client devices 102 may therefore be associated with one or more storage systems from which data is provided to the intelligent reporting platform 105 over the network 104 for real-time or batch processing.

A given such storage system illustratively comprises at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, also from Dell EMC. The storage system is illustratively configured to implement at least portions of one or more databases or data lakes associated with intelligent reporting platform 105.

The term "storage system" as the term is broadly used herein is not limited to storage arrays, but can comprise other types of storage systems. For example, a storage system can comprise network-attached storage (NAS), storage area networks (SANs), direct-attached storage (DAS)

and distributed DAS, as well as combinations of these and other storage types, including software-defined storage.

Other examples of particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although shown as separate from the intelligent reporting platform 105, one or more of the client devices 102 and the database 106 may be part of the same processing platform that implements the functionality of the intelligent reporting platform 105. For example, in embodiments in which one or more of the client devices 102 comprise at least portions of a storage system, the storage system can be implemented using one or more storage arrays or other storage resources of a given processing platform that also implements the functionality of the intelligent reporting platform 105. Such a processing platform is illustratively part of a cloud-based or enterprise-based data center.

In operation, the intelligent reporting platform 105 maintains a plurality of reporting templates in the form of respective data structures, with each of the data structures comprising a first field indicative of whether or not the corresponding template is a dynamic template and a plurality of additional fields comprising respective presentation unit identifiers having respective assigned values. The reporting templates are configured in accordance with the dynamic template definitions 122. The first field of the data structure of a given one of the reporting templates illustratively comprises a custom property of a slide-based report, although other types of reporting templates and fields can be used.

The intelligent reporting platform 105 is further configured to receive input data, and to identify at least one of the reporting templates that is relevant to the input data. For an identified reporting template that is a dynamic template, the report engine 110 generates report presentation output in which presentation units corresponding to respective ones of the presentation unit identifiers are generated based at least in part on respective portions of the input data. The intelligent reporting platform 105 delivers the report presentation output to at least one of the client devices 102 over the network 104.

A given one of the dynamic templates illustratively comprises in the plurality of additional fields of its data structure at least a first additional field comprising a first presentation unit identifier having a first assigned value indicating that the corresponding presentation unit is fixed and a second additional field comprising a second presentation unit identifier having a second assigned value different than the first assigned value and indicating that the corresponding presentation unit is not fixed but is instead variable and subject to modification based at least in part on a corresponding portion of the input data.

The fixed presentation unit is automatically included in the generation of report presentation output and the variable presentation unit is automatically excluded from the generation of report presentation output responsive to absence of a match between any presentation unit element of the received input data and a presentation unit element of the variable presentation unit.

The presentation units in some embodiments comprise respective slides of a slide-based report. In embodiments of this type, the plurality of additional fields of the data structure of a given one of the dynamic templates illustratively comprise respective presentation unit identifiers each identifying a different one of the slides of the slide-based report.

The assigned values of a first subset of the presentation unit identifiers indicate that the respective corresponding slides are fixed in the slide-based report and the assigned values of a second subset of the presentation unit identifiers indicate that the respective corresponding slides are variable in the slide-based report based at least in part on the received input data.

Examples of dynamic templates of this type will be described in more detail below in conjunction with FIGS. 5A and 5B.

Additionally or alternatively, a given one of the dynamic templates in some embodiments comprises at least one presentation unit identifier that identifies a presentation unit comprising one or more presentation elements including at least one of a dynamic text section, a dynamic chart and a dynamic table.

The intelligent reporting platform 105 is illustratively further configured to maintain the report component libraries 124. A given such report component library comprises a plurality of predefined presentation elements that are subject to modification based at least in part on a corresponding portion of the input data.

Examples of library components for implementing intelligent reporting services utilizing dynamic templates in an illustrative embodiment will be described in more detail below in conjunction with FIG. 6.

As indicated above, the intelligent reporting platform 105 via the report generation module 116 of report engine 110 is configured to generate report presentation output in which presentation units corresponding to respective ones of the presentation unit identifiers are generated based at least in part on respective portions of the input data. In some embodiments, this further comprises at least one of updating a dynamic text section of a given one of the presentation units utilizing a portion of the input data, updating a dynamic chart of the given presentation unit utilizing a portion of the input data, and updating a dynamic table of the given presentation unit utilizing a portion of the input data. A given instance of the updating illustratively comprises one of replacing and removing.

Examples of slides having display elements defined by dynamic templates for use in generating report presentation output utilizing the above-noted updating will be described below in conjunction with the slides of FIGS. 9 and 10.

In some embodiments, the report engine 110 of the intelligent reporting platform 105 is further configured to generate a list of presentation unit elements from the received input data. For a given one of the dynamic templates, the report engine 110 compares the presentation unit elements of the list to presentation unit elements of presentation units having the presentation unit identifiers of the given one of the dynamic templates, and identifies from the comparison and corresponding ones of the assigned values particular ones of the presentation units that are subject to modification based at least in part on a corresponding portion of the input data.

Additionally or alternatively, the report engine 110 of the intelligent reporting platform 105 is configured to automatically include in its generation of report presentation output any presentation unit having a presentation unit identifier in the given dynamic template with an assigned value indicating that the corresponding presentation unit is fixed for the given dynamic template.

Similarly, the report engine 110 of the intelligent reporting platform 105 is further configured to automatically exclude from its generation of report presentation output any presentation unit having a presentation unit identifier in the given dynamic template with an assigned value indicating that the corresponding presentation unit is variable for the given dynamic template, responsive to an absence of a match between any of the presentation unit elements of the list and a presentation unit element of the presentation unit having the presentation unit identifier in the given dynamic template.

The above-described operations of the report engine 110 of the intelligent reporting platform 105 are implemented at least in part utilizing one or more of the dynamic template processing logic 112, the component library processing logic 114 and the report generation module 116 of the report engine 110.

In some embodiments, the intelligent reporting service API or possibly other or more other APIs of the intelligent reporting platform 105 allow at least portions of one or more of the reporting templates to be configurable by a system user. For example, users associated with respective ones of the client devices 102 may be authorized to configure reporting templates by adjusting respective corresponding subsets of the dynamic template definitions.

The input data received by the intelligent reporting platform 105 can include a variety of different types of information. For example, the intelligent reporting platform 105 can be configured to automatically receive streaming data from one or more of the client devices 102, and/or to retrieve batch data periodically from one or more of the client devices 102. The term "input data" as used herein is intended to be broadly construed so as to encompass data streamed from, retrieved from or otherwise obtained from one or more of the client devices 102 or other data sources, such as the database 106. Such input data can therefore be obtained using various "push" or "pull" mechanisms implemented within the system 100, or combinations of such mechanisms. Different types of input data can be obtained from different ones of the client devices 102 and the database 106.

In some embodiments, portions of the input data are received via the intelligent reporting service API 120. One or more additional APIs may be incorporated into the intelligent reporting platform 105 for receiving input data from respective data sources. For example, a separate API may be included for interfacing with the database 106.

Some of the input data illustratively comprises metrics characterizing the performance of one or more monitored systems. Examples of metrics that may be extracted from or otherwise obtained from input data in some embodiments and utilized in generation of report presentation output include resource utilization metrics (e.g., CPU and/or memory utilization), network utilization metrics (e.g., inbound network traffic, outbound network traffic, network traffic volume and/or dropped packet rate) and application metrics (e.g., session errors, response times and/or error rates), as well as numerous others. Such metrics are used in some embodiments to populate presentation units of a dynamic template.

The intelligent reporting platform 105 is illustratively configured to perform various types of automated decision making and other automated processing via the report engine 110. For example, the report engine 110 can implement machine learning algorithms or other types of artificial intelligence (AI) configured to autonomously direct the system 100, and/or one or more related systems that are monitored at least in part utilizing the intelligent reporting functionality of system 100, towards respective optimal operating configurations.

The intelligent reporting platform 105 in some embodiments is illustratively configured to provide alerts and other messaging output to a message broker, such as an Apache Kafka® message broker, for delivery to the client devices 102.

The intelligent reporting service API 120 can be configured to permit at least portions of the dynamic template definitions 122 and report component libraries 124 to be configurable by a system administrator or other system user. Such arrangements can facilitate sharing of a given set of dynamic templates between multiple distinct cloud infrastructure tenants.

The intelligent reporting platform 105 can include additional or alternative components in other embodiments. For example, the intelligent reporting platform 105 can include an analytics engine implemented in or otherwise associated with the report engine 110.

A given such analytics engine can comprise an Apache Flink® stream processing framework suitably modified to support dynamic template based intelligent reporting service functionality as disclosed herein.

The analytics engine can alternatively comprise an Apache Spark cluster computing framework configured to perform Spark streaming computations utilizing Spark resilient distributed datasets (RDDs), again modified to support dynamic template based intelligent reporting service functionality as disclosed herein.

The database 106 illustratively comprises a time-series database. An example of a time-series database that can be used in some embodiments is InfluxDB. Such a time-series database can be configured to support dynamic template based intelligent reporting service functionality as disclosed herein.

It is to be appreciated that components of the intelligent reporting platform 105 can be implemented within respective separate physical systems in some embodiments. A processing platform such as the intelligent reporting platform 105 in the FIG. 1 embodiment can therefore be implemented as a combination of multiple distinct physical systems or as a single physical system. Accordingly, the particular arrangement of intelligent reporting platform 105 and its components as shown in FIG. 1 is presented by way of example only.

In other embodiments, only subsets of these components, or additional or alternative sets of components, may be used, and such components may exhibit alternative functionality and configurations. In addition, as previously noted, at least a subset of the client devices 102 may be part of the same processing platform that is used to implement at least a portion of the intelligent reporting platform 105.

The operation of the information processing system 100 will now be described in further detail with reference to the flow diagram of the illustrative embodiment of FIG. 2. This figure illustrates a process that includes steps 200 through 210, and is suitable for use in system 100 but is more generally applicable to other types of information processing systems that implement dynamic template based intelligent reporting service functionality.

Figure 2:
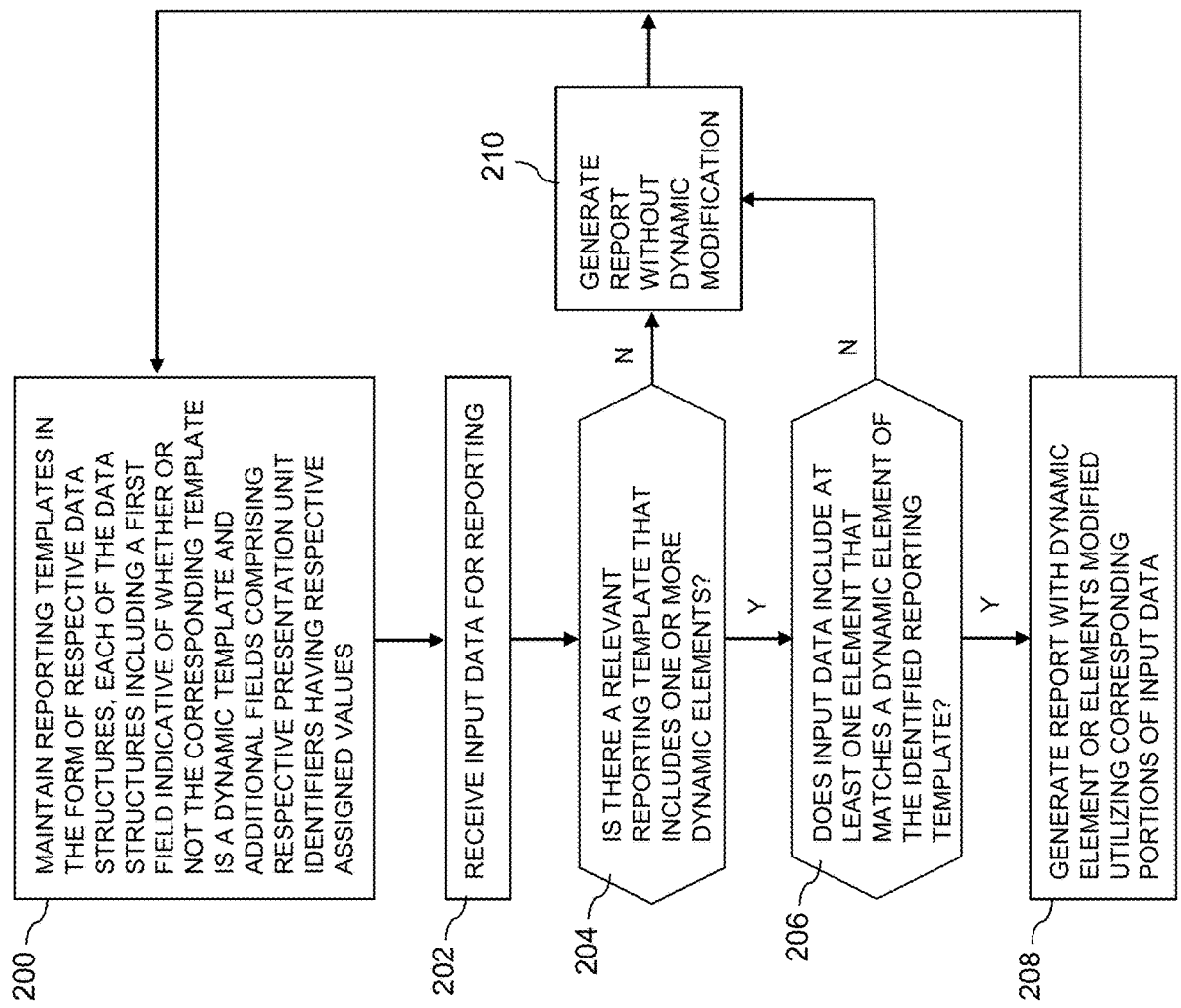
FIG. 2 is a flow diagram of an exemplary process for implementing intelligent reporting services utilizing dynamic templates in an illustrative embodiment.

The steps of the flow diagram of FIG. 2 in some implementations are illustratively performed at least in part under the control of the report engine 110 in the intelligent reporting platform 105 of system 100 utilizing components such as the dynamic template processing logic 112, the component library processing logic 114 and the report generation module 116. For example, these components of the report engine 110 can comprise program code that implements respective portions of the FIG. 2 process.

In step 200, reporting templates are maintained in the form of respective data structures, with each of the data structures including a first field indicative of whether or not the corresponding template is a dynamic template and additional fields comprising respective presentation unit identifiers having respective assigned values.

In step 202, input data for reporting is received from one or more data sources. The received input data can comprise real-time data, batch data or other types and arrangements of data, obtained via any of a wide variety of mechanisms. For example, the received input data may comprise at least one of real-time streaming data received from one or more real-time data sources and batch data retrieved from one or more databases or data lakes.

In step 204, a determination is made as to whether or not there is a relevant reporting template that includes one or more dynamic elements. If there is at least one such relevant reporting template with at least one dynamic element, the process moves to step 206, and otherwise moves to step 210 as shown.

In step 206, a determination is made as to whether or not the input data includes at least one element that matches a dynamic element of the identified reporting template. If the input data includes at least one such element, the process moves to step 208, and otherwise moves to step 210 as shown.

In step 208, a report is generated with the one or more dynamic elements each modified utilizing corresponding portions of the input data. The process then returns to step 200 as indicated to continue maintaining the reporting templates prior to receiving additional input data for reporting.

As mentioned previously, various automated processing operations may be performed utilizing report output of the type generated by intelligent reporting services in the FIG. 2 process. For example, automated alerts can be generated and transmitted to client devices or other system components. Alerts may be in the form of reports or portions thereof that are periodically provided to IT operations specialists or other system users via their respective client devices or other processing devices.

In some embodiments, automated processing operations include remedial actions such as automatically altering an allocation of network, storage and compute resources within the information processing system in order to drive the system and/or a related monitored system toward an optimal operating configuration based at least in part on the generated reports. This may more particularly involve, for example, adjusting a number of running containers or virtual machines for one or more applications, migrating containers or virtual machines for one or more application from one host device to another, and modifying an amount of compute, storage and network resources that are allocated to a given application. Numerous other types of automated processing operations can be performed in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing dynamic template based intelligent reporting service functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different intelligent reporting services for respective different sets of input data within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems with dynamic template based intelligent reporting service functionality will now be described with reference to FIGS. 3 through 10.

Figure 3:
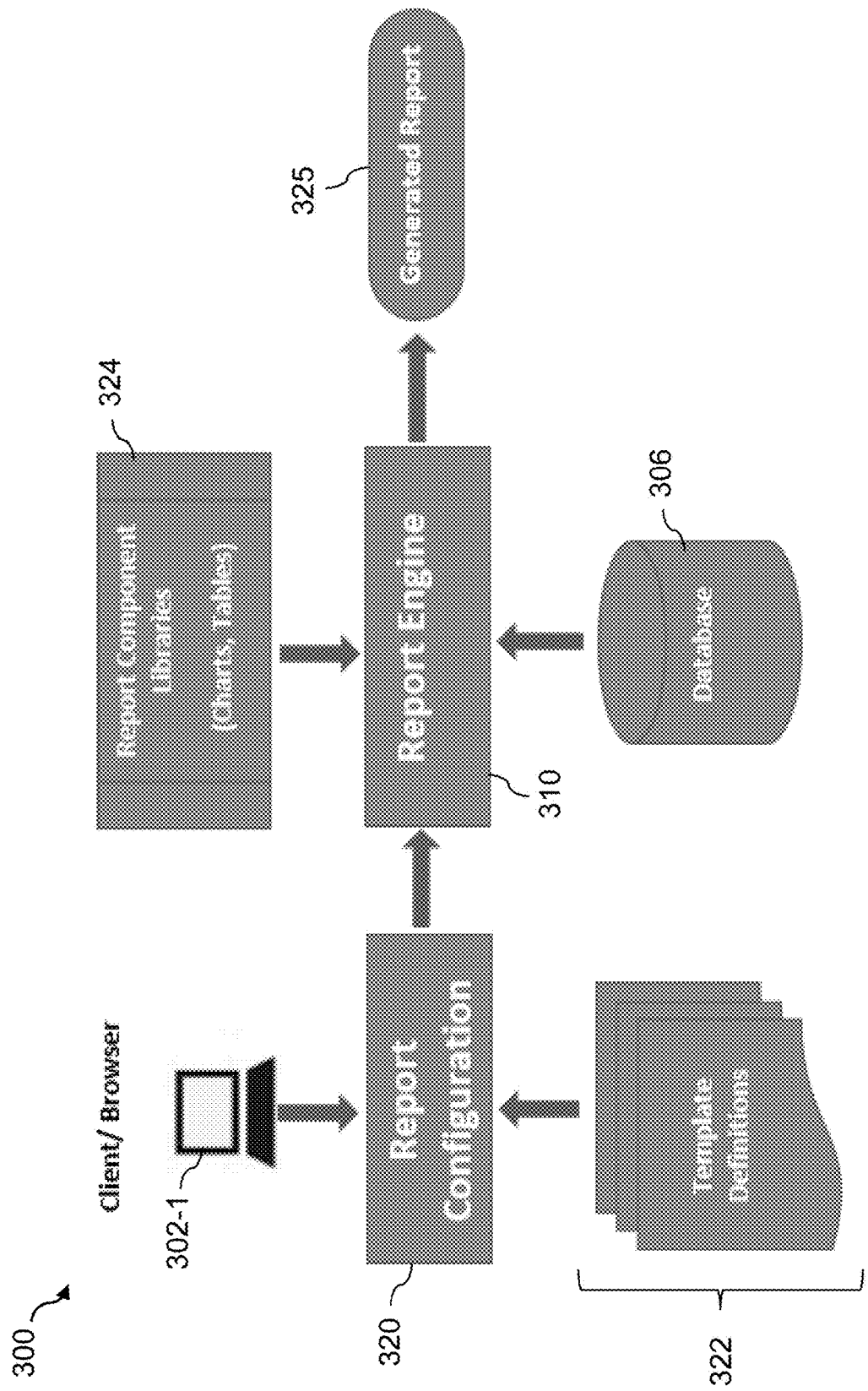
FIG. 3 shows an additional example of an information processing system implementing intelligent reporting services utilizing dynamic templates in another embodiment.

Referring now to FIG. 3, an information processing system 300 in another illustrative embodiment is shown. The system 300 implements intelligent reporting services utilizing dynamic templates. The system 300 comprises a client device 302-1 ("client") that is assumed to be equipped with a web browser. The system 300 further comprises a database 306, a report engine 310, a report configuration module 320, dynamic template definitions 322 and report component libraries 324. A user of the client device 302-1 utilizes the web browser to access a report configuration module 320 that illustratively comprises one or more APIs, such as an intelligent reporting service API 120 of the type previously described in conjunction with FIG. 1. The database 306, report engine 310, dynamic template definitions 322 and report component libraries 324 of system 300 are generally configured in substantially the same manner as that previously described for corresponding components 106, 110, 122 and 124 of system 100 in the FIG. 1 embodiment.

The report engine 310 maintain a plurality of reporting templates in the form of respective data structures, with each of the data structures comprising a first field indicative of whether or not the corresponding template is a dynamic template and a plurality of additional fields comprising respective presentation unit identifiers having respective assigned values. The report engine 310 receives input data from at least one of the client device 302-1 and the database 306, and utilizes the dynamic template definitions 322 and the report component libraries 324 to identify at least one of the reporting templates that is relevant to the input data. For an identified reporting template that is a dynamic template, the report engine 310 generates report presentation output comprising a generated report 325 in which presentation units corresponding to respective ones of the presentation unit identifiers are generated based at least in part on respective portions of the input data. The report presentation output comprising the generated report 325 is illustratively delivered over a network to the client device 302-1.

Figure 4:
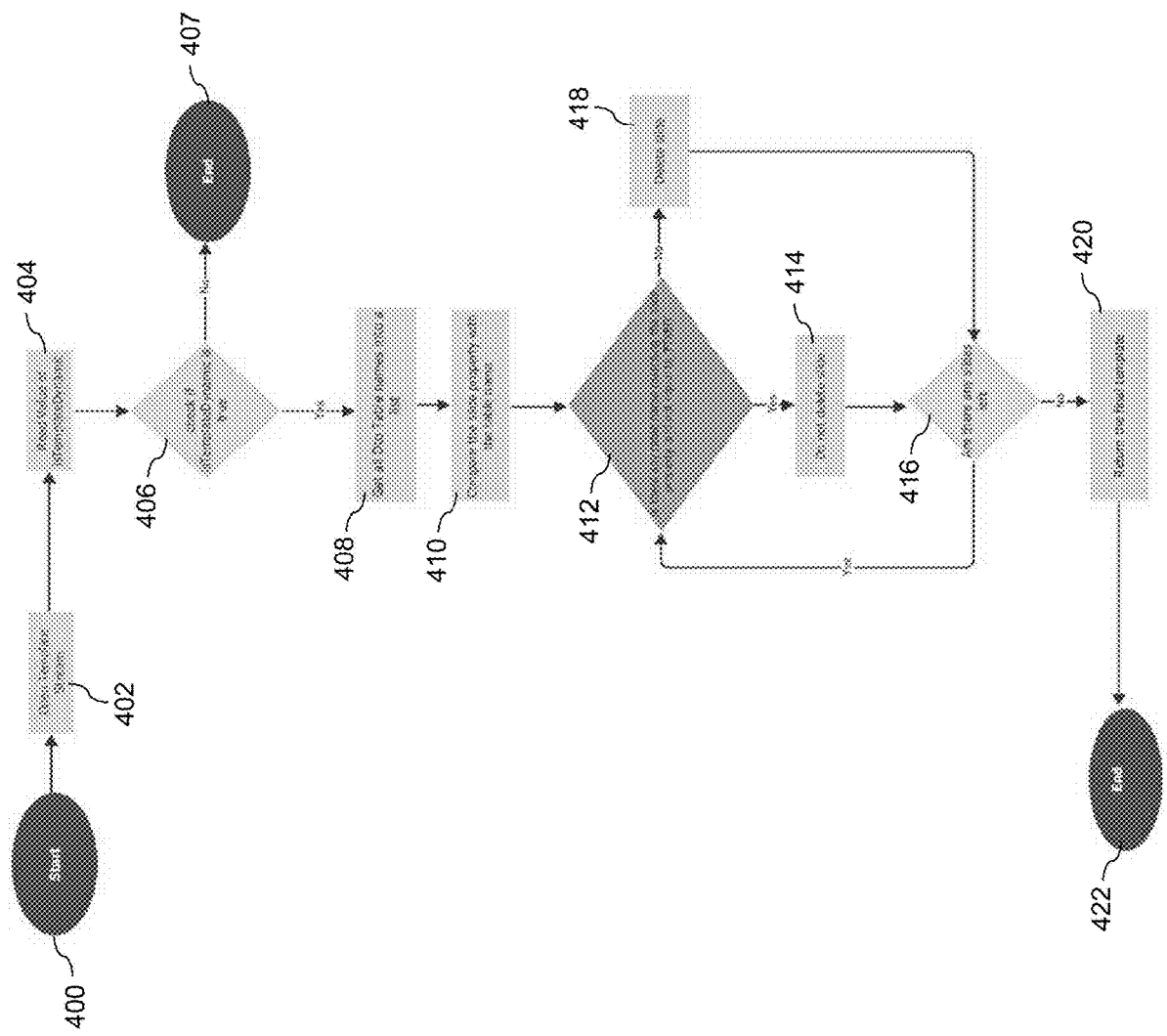
FIG. 4 shows an additional example of a process for implementing intelligent reporting services utilizing dynamic templates in another embodiment.

FIG. 4 shows an additional example of a process for implementing intelligent reporting services utilizing dynamic templates in another embodiment. The process includes steps 400 through 422 and is illustratively performed at least in part by a report engine such as report engine 110 of FIG. 1 or report engine 310 of FIG. 3.

The process begins in step 400 and a template stream is opened in step 402. The template stream illustratively comprises one or more reporting templates, a particular one of which is further processed beginning in step 404 with the reading of a value of an isTemplateDynamic field of the reporting template. The isTemplateDynamic field is an example of what is more generally referred to herein as a "first field" indicative of whether or not the corresponding template is a dynamic template. An example of the isTemplateDynamic field can be seen in the dynamic template of FIG. 5A.

In step 406, a determination is made as to whether or not the isTemplateDynamic field is "true" (e.g., contains a YES value), which indicates that the reporting template currently being processed is a dynamic reporting template. If the isTemplateDynamic field is not true (e.g., contains a NO value), the process ends for that reporting template in step 407, and although not explicitly indicated in the figure may return to step 404 to process another reporting template of the template stream. If the isTemplateDynamic field is true, the process moves to step 408 as indicated.

In step 408, a listing of presentation unit identifiers (e.g., table names, and more particularly "Dto Table" names) is extracted into a list. Other types of presentation unit identifiers can be used in other embodiments.

In step 410, slide properties of the dynamic template are compared to the table names.

In step 412, a determination is made as to whether or not any table name matches the slide property and the slide property is not equal to FIXED. The FIXED value is an example of what is more generally referred to herein as a "first assigned value" indicating that that the corresponding presentation unit in a corresponding field of the dynamic template is fixed. Other presentation unit identifiers in other fields of the dynamic template can have different assigned values, such as a "second assigned value" indicating that the corresponding presentation unit is not fixed but is instead variable and subject to modification based at least in part on a corresponding portion of the input data. These fields of the dynamic template are examples of what are more generally referred to herein as "additional fields" comprising respective presentation unit identifiers having respective assigned values.

Figure 5A:
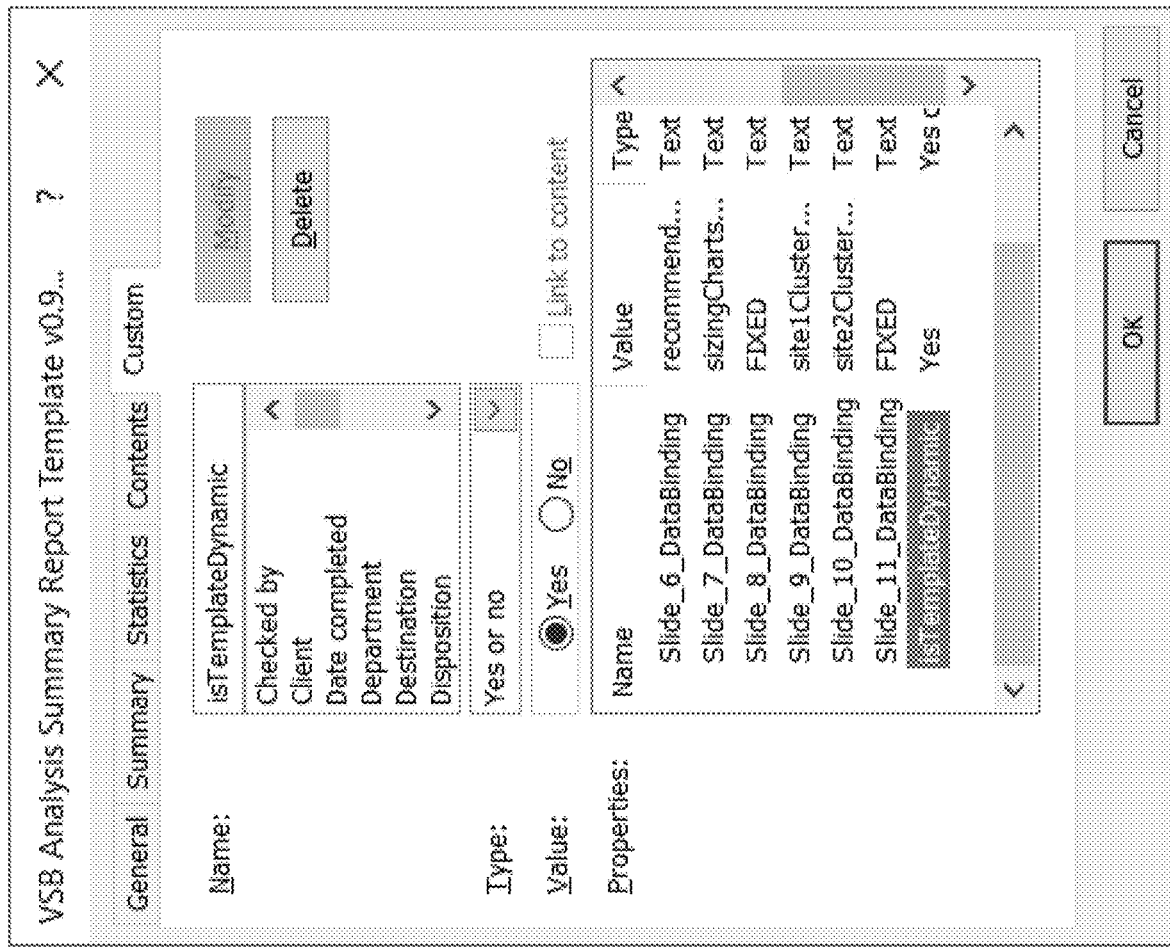
FIGS. 5A and 5B illustrate examples of dynamic templates in illustrative embodiments.
Figure 5B:
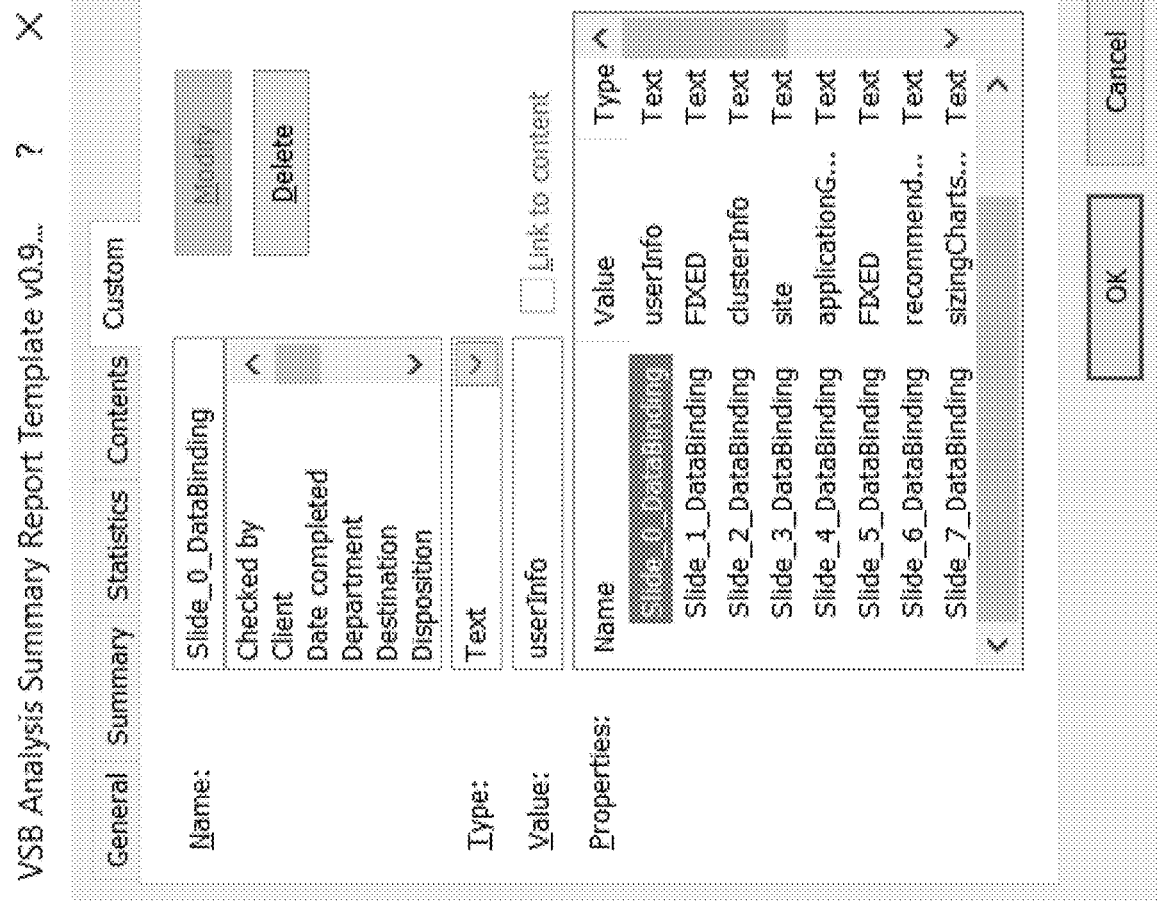

Examples of these additional fields, including one or more additional fields having the FIXED value and others having different assigned values, can be seen in the dynamic template of FIG. 5B.

With reference again to the dynamic template of FIG. 5A, this embodiment utilizes an advanced custom property of a Microsoft PowerPoint Presentation to control the dynamic property of a given reporting template. More particularly, the advanced custom property in the reporting template is utilize to incorporate the above-described isTemplateDynamic field to indicate whether the template is dynamic. A YES value in this field indicates that the reporting template is a dynamic template, and a NO value or a missing value in this field indicates that the reporting template is not a dynamic template. In the case of a YES value, the reporting template is dynamic, and each slide of the dynamic template has either a FIXED value, indicating that the corresponding slide will always be part of the generated report, or a dynamic value. The dynamic value indicates that the slide will be deleted when there is no matching property found in the input data used to generate the report. If there is a dynamic value and at least one matching property is present, the slide will be retained in the report and the input data will be mapped to the corresponding presentation elements of the slide.

As shown in the example of FIG. 5B, the Slide_1_DataBinding property is set to FIXED in this dynamic template, indicating that the slide will not be deleted and will remain as part of the generated report. The Slide_0_DataBinding property is not FIXED and is therefore dynamic. The Slide_0_DataBinding property in this example has value userInfo, which is assumed to match a corresponding portion of the input data. The slide will therefore be retained and the input data will be mapped to the slide. Again, a slide that is not fixed but has no matching property in the input data will be deleted.

Returning now to the description of FIG. 4, if there is at least one table name that matches a slide property and the slide property is not equal to FIXED, the slide is not deleted in step 414 but instead remains in the dynamic template, and the process moves to step 416 to determine if there are any additional slides left to process. Otherwise the slide is deleted in step 418 and then moves to step 416 to determine if there are any additional slides left to process.

After it is determined in step 416 that all slides associated with the dynamic template have been processed, the process moves to step 420 to return the final template configured for modification in accordance with input data, and then ends in step 422. Other instances of the process can be performed for other dynamic templates associated with a given report generation instance.

As in the flow diagram of FIG. 2, the particular processing operations and other system functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different dynamic template processing arrangements for different template streams within a given information processing system.

Also, functionality such as that described in conjunction with the flow diagram of FIG. 4 can be implemented at least in part in the form of one or more software programs stored in a memory or other storage device and executed by a processor of a processing device such as a computer or server.

Referring now to FIG. 6, example library components are shown, representing at least a portion of the report component libraries 124 of system 100 or the report component libraries 324 of system 300. These library components are utilized in implementing intelligent reporting services based on dynamic templates in an illustrative embodiment. More particularly, these library components are utilized to facilitate replacement of variable presentation units of a given dynamic template.

The library components in this example include components for loading a template, replacing a header, replacing text and replacing a table, although these are just examples and numerous other library components could be used in other embodiments.

FIGS. 7A through 7E show respective portions of software program code for performing respective replace text, remove section, replace header, replace table and delete slide functionality for corresponding library components. Again, these code portions are provided by way of illustrative example only, and should not be viewed as limiting in any way. These are examples of library components that may be used in conjunction with dynamic templates in illustrative embodiments.

Referring now to FIG. 8, sample report input data is shown. The sample report input data in this embodiment specifies a user name, current date and current year as indicated.

Figure 9:
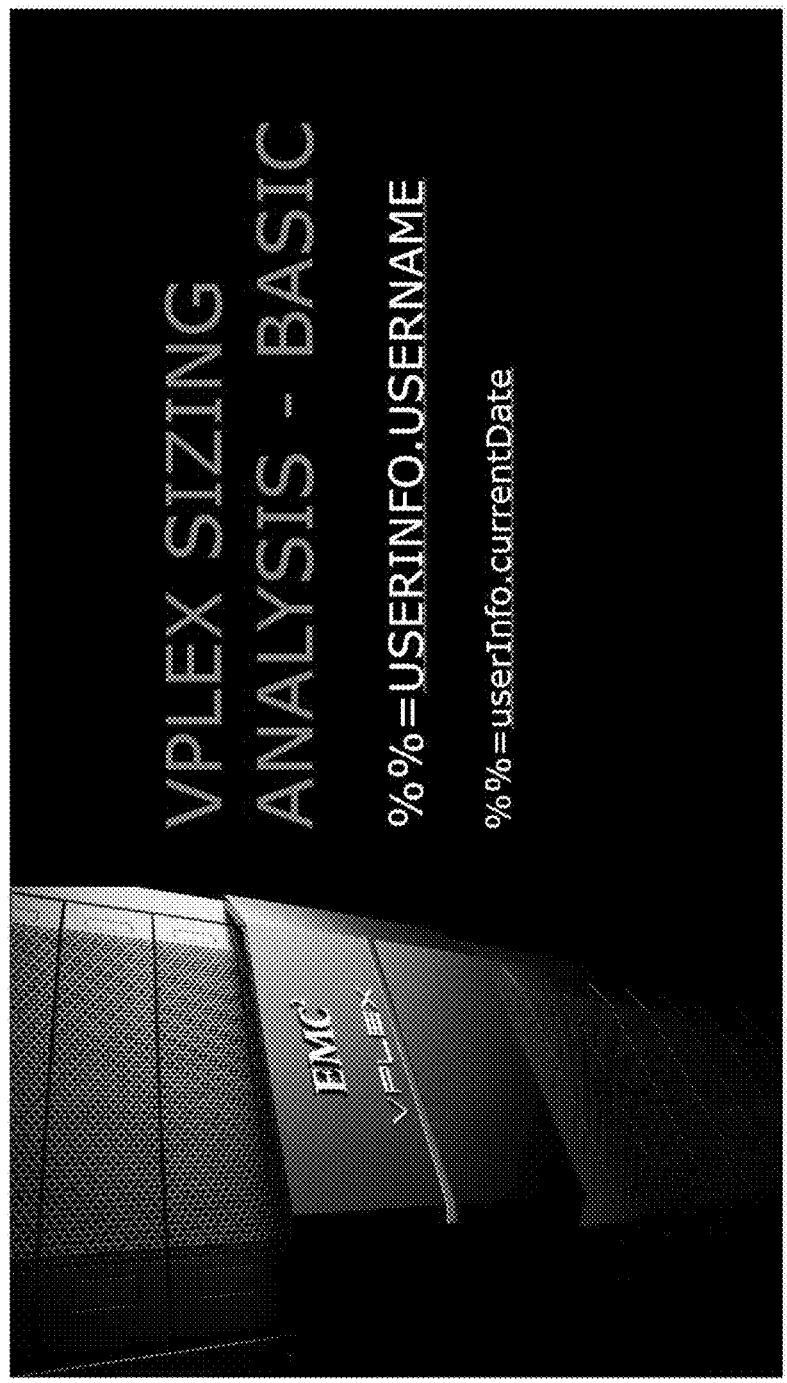
FIGS. 9 and 10 show examples of slides having display elements defined by dynamic templates in an illustrative embodiment.

The FIG. 8 input data is utilized to populate the example slide shown in FIG. 9. This slide is part of a dynamic template and is a type of "presentation unit" in an embodiment in which presentation units comprise respective slides of a slide-based report. Other types of presentation units can be used in other embodiments.

Figure 10:
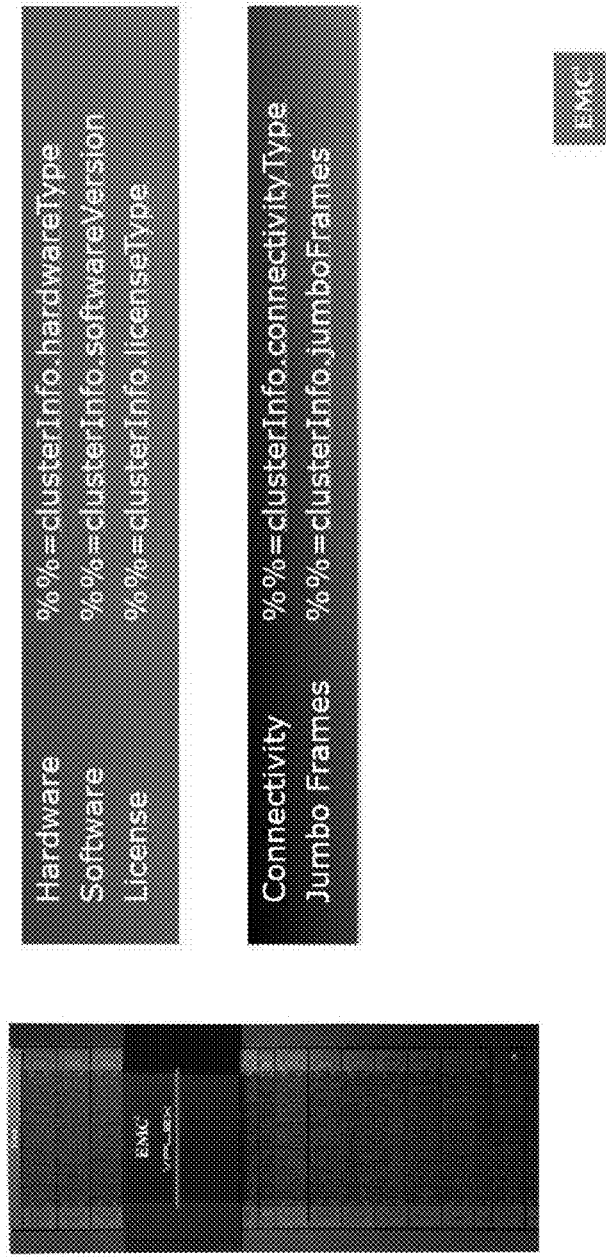

FIG. 10 shows another example of a presentation unit in the form of a slide of a slide-based report. The dynamic template in this embodiment defines multiple dynamic display elements that are subject to modification based on input data, including dynamic display elements for hardware, software, license, connectivity and jumbo frames. These dynamic display elements are rendered with appropriate values based on the input data, and will therefore vary depending upon the time of rendering and the current input data.

A wide variety of other types of presentation units having associated presentation elements can be controlled using dynamic templates as disclosed herein, and the illustrative embodiments are not limited in this regard.

Illustrative embodiments of information processing systems with dynamic template based intelligent reporting service functionality as disclosed herein can provide a number of significant advantages relative to conventional arrangements.

For example, some embodiments are in the form of an intelligent reporting platform that provides intelligent reporting services such as automated report generation to clients over a network, based at least in part on dynamic templates that illustratively incorporate user-configurable fields for characterizing dynamic input for respective slides or other types of report presentation output.

These and other embodiments implement reporting functionality that readily scales to accommodate a wide variety of different business needs while also decreasing the time and cost involved. For example, some embodiments are configured to provide a decoupling of report layout and rendering, intelligent template reporting adaptable to changing requirements, and reusable template definitions.

Moreover, automated decision making and other automated processing performed in an information processing system utilizing report output is considerably enhanced through the use of intelligent reporting services, leading to improved system performance.

Some embodiments provide a standard and generic mechanism to efficiently control reporting in a wide variety of different processing frameworks.

These and other embodiments utilize dynamic templates to provide accurate and efficient reporting of real-time and batch data obtained from numerous different types of data sources.

The dynamic template based intelligent reporting service functionality disclosed herein allows efficient management of data reporting irrespective of whether the data to be reported is centralized or distributed, while also reducing code complexity and promoting sharing and reusability of intelligent reporting services. Such embodiments allow intelligent reporting services to be deployed in an efficient manner that enhances the quality of decision making.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement dynamic template based intelligent reporting service functionality will now be described in greater detail with reference to FIGS. 11 and 12. Although described in the context of system 100, these platforms may also be used to implement at least portions of other information processing systems in other embodiments.

Figure 11:
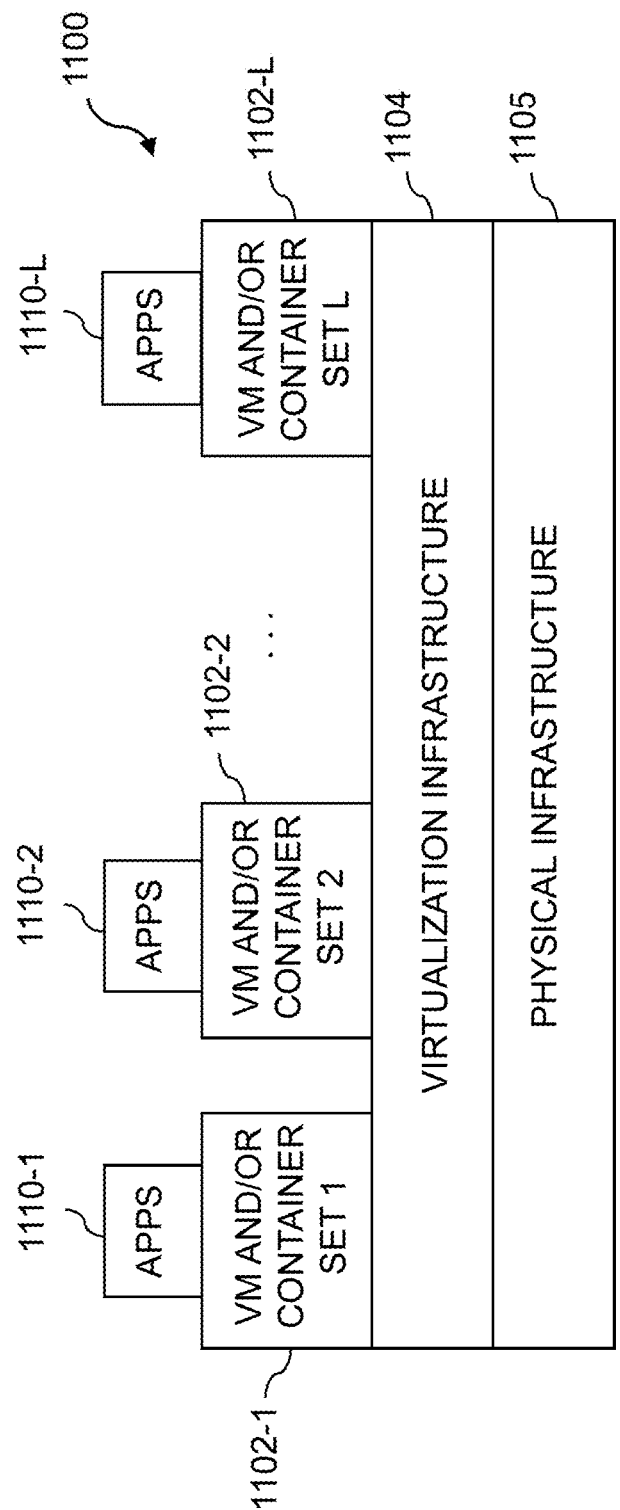

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide dynamic template based intelligent reporting service functionality of the type described above utilizing one or more of the VMs.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide dynamic template based intelligent reporting service functionality of the type described above utilizing one or more of the containers. For example, a container host device supporting multiple containers of one or more container sets can implement one or more instances of the FIG. 2 process for providing intelligent reporting services.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, ... 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, client devices, networks, databases, processing platforms, report engines, libraries, dynamic templates and other components and features. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a processing platform comprising a plurality of processing devices each comprising a processor coupled to a memory;
the processing platform being configured to communicate over a network with one or more client devices;
the processing platform being further configured:
to maintain a plurality of reporting templates, including a plurality of dynamic templates, in the form of respective data structures, each of the data structures comprising a first field indicative of whether or not the corresponding template is a dynamic template and a plurality of additional fields comprising respective presentation unit identifiers having respective assigned values;
to receive input data;
to identify at least one of the reporting templates that is relevant to the input data;
for an identified reporting template that is a dynamic template, to generate report presentation output in which presentation units corresponding to respective ones of the presentation unit identifiers are generated based at least in part on respective portions of the input data; and
to deliver the report presentation output to at least one of the client devices over the network;

wherein a given one of the dynamic templates comprises in the plurality of additional fields of its data structure at least a first additional field comprising a first presentation unit identifier having a first assigned value indicating that the corresponding presentation unit is fixed and a second additional field comprising a second presentation unit identifier having a second assigned value different than the first assigned value and indicating that the corresponding presentation unit is not fixed but is instead variable and subject to modification based at least in part on a corresponding portion of the input data; and wherein the processing platform is further configured:

to generate a list of presentation unit elements from the received input data, and for a given one of the dynamic templates to compare the presentation unit elements of the list to presentation unit elements of presentation units having the presentation unit identifiers of the given one of the dynamic templates, and to identify from the comparison and corresponding ones of the assigned values particular ones of the presentation units that are subject to modification based at least in part on a corresponding portion of the input data.

2. The apparatus of claim 1 wherein the presentation units comprise respective slides of a slide-based report.

3. The apparatus of claim 2 wherein the plurality of additional fields of the data structure of a given one of the dynamic templates comprise respective presentation unit identifiers each identifying a different one of the slides of the slide-based report.

4. The apparatus of claim 3 wherein the assigned values of a first subset of the presentation unit identifiers indicate that the respective corresponding slides are fixed in the slide-based report and the assigned values of a second subset of the presentation unit identifiers indicate that the respective corresponding slides are variable in the slide-based report based at least in part on the received input data.

5. The apparatus of claim 1 wherein a given one of the dynamic templates comprises at least one presentation unit identifier that identifies a presentation unit comprising one or more presentation elements including at least one of a dynamic text section, a dynamic chart and a dynamic table.

6. The apparatus of claim 1 wherein the processing platform is further configured to maintain one or more report component libraries each comprising a plurality of pre-defined presentation elements that are subject to modification based at least in part on a corresponding portion of the input data.

7. The apparatus of claim 1 wherein generating report presentation output in which presentation units corresponding to respective ones of the presentation unit identifiers are generated based at least in part on respective portions of the input data comprises at least one of updating a dynamic text section of a given one of the presentation units utilizing a portion of the input data, updating a dynamic chart of the given presentation unit utilizing a portion of the input data, and updating a dynamic table of the given presentation unit utilizing a portion of the input data.

8. The apparatus of claim 7 wherein a given instance of the updating comprises one of replacing and removing.

9. The apparatus of claim 1 wherein the first field of the data structure of a given one of the reporting templates comprises a custom property of a slide-based report.

10. The apparatus of claim 1 wherein the processing platform is further configured to automatically include in its generation of report presentation output any presentation unit having a presentation unit identifier in the given dynamic template with an assigned value indicating that the corresponding presentation unit is fixed for the given dynamic template.

11. The apparatus of claim 1 wherein the processing platform is further configured to automatically exclude from its generation of report presentation output any presentation unit having a presentation unit identifier in the given dynamic template with an assigned value indicating that the corresponding presentation unit is variable for the given dynamic template, responsive to an absence of a match between any of the presentation unit elements of the list and a presentation unit element of the presentation unit having the presentation unit identifier in the given dynamic template.

12. The apparatus of claim 1 wherein the fixed presentation unit is automatically included in the generation of report presentation output and the variable presentation unit is automatically excluded from the generation of report presentation output responsive to absence of a match between any presentation unit element of the received input data and a presentation unit element of the variable presentation unit.

13. The apparatus of claim 1 wherein the processing platform is configured to provide an application programming interface through which at least portions of one or more of the reporting templates are configurable by a system user.

14. A method comprising:

maintaining a plurality of reporting templates, including a plurality of dynamic templates, in the form of respective data structures, each of the data structures comprising a first field indicative of whether or not the corresponding template is a dynamic template and a plurality of additional fields comprising respective presentation unit identifiers having respective assigned values;

receiving input data;

identifying at least one of the reporting templates that is relevant to the input data;

for an identified reporting template that is a dynamic template, generating report presentation output in which presentation units corresponding to respective ones of the presentation unit identifiers are generated based at least in part on respective portions of the input data; and delivering the report presentation output to at least one client device over a network;

wherein a given one of the dynamic templates comprises in the plurality of additional fields of its data structure at least a first additional field comprising a first presentation unit identifier having a first assigned value indicating that the corresponding presentation unit is fixed and a second additional field comprising a second presentation unit identifier having a second assigned value different than the first assigned value and indicating that the corresponding presentation unit is not fixed but is instead variable and subject to modification based at least in part on a corresponding portion of the input data;

wherein the method further comprises generating a list of presentation unit elements from the received input data, and for a given one of the dynamic templates to compare the presentation unit elements of the list to presentation unit elements of presentation units having the presentation unit identifiers of the given one of the dynamic templates, and to identify from the comparison and corresponding ones of the assigned values particular ones of the presentation units that are subject to modification based at least in part on a corresponding portion of the input data; and wherein the method is implemented by a processing platform comprising a plurality of processing devices each comprising a processor coupled to a memory.

15. The method of claim 14 wherein the presentation units comprise respective slides of a slide-based report and the plurality of additional fields of the data structure of a given one of the dynamic templates comprise respective presentation unit identifiers each identifying a different one of the slides of the slide-based report.

16. A computer program product comprising a non-transitory processor-readable storage medium having stored therein program code of one or more software programs, wherein the program code when executed by a processing platform comprising a plurality of processing devices, each such processing device comprising a processor coupled to a memory, causes the processing platform:

to maintain a plurality of reporting templates, including a plurality of dynamic templates, in the form of respective data structures, each of the data structures comprising a first field indicative of whether or not the corresponding template is a dynamic template and a plurality of additional fields comprising respective presentation unit identifiers having respective assigned values;

to receive input data;

to identify at least one of the reporting templates that is relevant to the input data;

for an identified reporting template that is a dynamic template, to generate report presentation output in which presentation units corresponding to respective ones of the presentation unit identifiers are generated based at least in part on respective portions of the input data; and to deliver the report presentation output to at least one client device over a network;

wherein a given one of the dynamic templates comprises in the plurality of additional fields of its data structure at least a first additional field comprising a first presentation unit identifier having a first assigned value indicating that the corresponding presentation unit is fixed and a second additional field comprising a second presentation unit identifier having a second assigned value different than the first assigned value and indicating that the corresponding presentation unit is not fixed but is instead variable and subject to modification based at least in part on a corresponding portion of the input data; and wherein the program code when executed by the processing platform further causes the processing platform to generate a list of presentation unit elements from the received input data, and for a given one of the dynamic templates to compare the presentation unit elements of the list to presentation unit elements of presentation units having the presentation unit identifiers of the given one of the dynamic templates, and to identify from the comparison and corresponding ones of the assigned values particular ones of the presentation units that are subject to modification based at least in part on a corresponding portion of the input data.

17. The computer program product of claim 16 wherein the presentation units comprise respective slides of a slide-based report and the plurality of additional fields of the data structure of a given one of the dynamic templates comprise respective presentation unit identifiers each identifying a different one of the slides of the slide-based report.

18. The computer program product of claim 17 wherein the assigned values of a first subset of the presentation unit identifiers indicate that the respective corresponding slides are fixed in the slide-based report and the assigned values of a second subset of the presentation unit identifiers indicate that the respective corresponding slides are variable in the slide-based report based at least in part on the received input data.

19. The computer program product of claim 16 wherein a given one of the dynamic templates comprises at least one presentation unit identifier that identifies a presentation unit comprising one or more presentation elements including at least one of a dynamic text section, a dynamic chart and a dynamic table.

20. The computer program product of claim 16 wherein the program code when executed by the processing platform further causes the processing platform to one or more of:

(i) automatically include in its generation of report presentation output any presentation unit having a presentation unit identifier in the given dynamic template with an assigned value indicating that the corresponding presentation unit is fixed for the given dynamic template; and (ii) automatically exclude from its generation of report presentation output any presentation unit having a presentation unit identifier in the given dynamic template with an assigned value indicating that the corresponding presentation unit is variable for the given dynamic template, responsive to an absence of a match between any of the presentation unit elements of the list and a presentation unit element of the presentation unit having the presentation unit identifier in the given dynamic template.

* * * * *